United States Patent [19]

Kumasaka et al.

[11] 4,338,271
[45] Jul. 6, 1982

[54] METHOD FOR MANUFACTURING A LOW DENSITY SYNTHETIC RESIN BODY

[75] Inventors: Sadao Kumasaka, Tanashi; Satomi Tada, Tokyo; Shigeo Horikoshi; Tokio Tsuchiya, both of Kawagoe; Masashi Numabe, Saitama, all of Japan

[73] Assignee: Toyo Rubber Chemical Industrial Corp., Tokyo, Japan

[21] Appl. No.: 152,784

[22] Filed: May 23, 1980

[30] Foreign Application Priority Data

| May 28, 1979 | [JP] | Japan | 54-65843 |
| Dec. 24, 1979 | [JP] | Japan | 54-167772 |
| Dec. 27, 1979 | [JP] | Japan | 54-171406 |
| Dec. 27, 1979 | [JP] | Japan | 54-171407 |
| Dec. 27, 1979 | [JP] | Japan | 54-171408 |

[51] Int. Cl.$^3$ .............................................. B29D 27/00
[52] U.S. Cl. ....................................... 264/54; 264/338; 264/DIG. 5; 264/DIG. 18
[58] Field of Search ................. 264/DIG. 18, 54, 338, 264/DIG. 5

[56] References Cited

U.S. PATENT DOCUMENTS

| 2,199,006 | 4/1940 | Minor | 264/54 X |
| 2,826,244 | 3/1958 | Hurley | 264/54 X |
| 2,878,523 | 3/1959 | Hardy | 264/54 X |
| 3,389,196 | 6/1968 | Stahl | 264/338 X |
| 3,452,123 | 6/1969 | Beckmann et al. | 264/DIG.18 |
| 3,608,006 | 9/1971 | Hosoda et al. | 264/DIG. 18 |
| 3,812,225 | 5/1974 | Hosoda et al. | 264/DIG. 18 |

Primary Examiner—Philip Anderson
Attorney, Agent, or Firm—Frishauf, Holtz, Goodman & Woodward

[57] ABSTRACT

A method for manufacturing a low density synthetic resin foamed body is disclosed which is characterized by the steps of filling a mixture of 100 parts by weight of an ethylene-vinyl acetate copolymer, 20-80 parts by weight of a foaming agent, and 1.0-5.0 parts by weight of a crosslinking agent in a mold, closing the mold with a lid, heating the mold to form a foamed body, cooling the foamed body as it is kept in the mold, and opening the lid of the mold.

14 Claims, 1 Drawing Figure

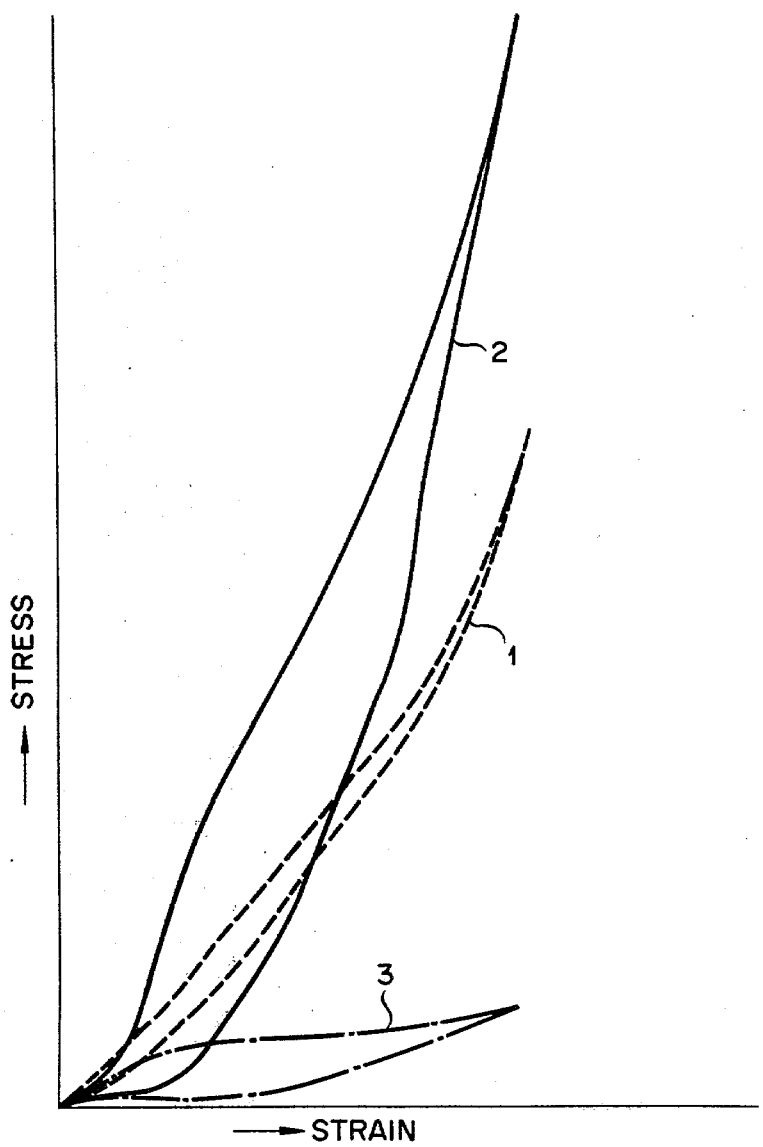

METHOD FOR MANUFACTURING A LOW DENSITY SYNTHETIC RESIN BODY

The present invention relates to a low density synthetic resin copolymer having as its main component an ethylene-vinyl acetate copolymer (to be referred to as EVA for brevity hereinafter) and a manufacturing method therefor. EVA foamed bodies are known and have been commonly used as raw materials where abrasion resistance is particularly required, as in the soles of shoes or sandals, since they show excellent abrasion resistance and bending strength.

For manufacturing EVA foamed bodies, a foaming agent and a crosslinking agent are added to the main ingredient, i.e., an ethylene-vinyl acetate copolymer. After the mixture is kneaded, it is put in a mold and heat foamed. The amount of the foaming agent added is at most 3–5 parts by weight based on 100 parts by weight of ethylene-vinyl acetate. The resultant density of the foamed body is at most 0.2–0.4 and the expansion ratio is 5–2.5. Thus, the EVA foamed bodies are manufactured by first adding a foaming agent and a crosslinking agent to the EVA, kneading the mixture and forming the mixture into a sheet form. The sheet is put into a mold, and substantially fills it. The mold is securely covered with a lid and is heated thereafter for the foaming process. The EVA foamed material thus derived is in an extremely compressed condition in the mold during the molding procedure. Upon opening the mold, the molded article abruptly expands to several times the capacity of the mold. The ratio of the total volume of the formed body with respect to the capacity of the mold cavity is determined by the amount of the foaming agent used. Conventionally, the expansion ratio has been limited to 5–2.5; the density of the foamed body, to 0.2–0.4; and the amount of the foaming agent used with respect to 100 parts by weight of ethylene-vinyl acetate copolymer, to 5–15 parts by weight. When an attempt is made to raise the expansion ratio or to decrease the density of the foamed body by using a larger amount of the foaming agent, the foaming pressure within the mold is raised abnormally, resulting in an explosion and scattering of the foam upon opening the mold. Thus, foamed bodies of this kind have not been manufactured.

To overcome this problem of explosion and scattering of foam, it has been proposed to use a smaller amount of the foamable sheet than the capacity of the mold to allow a space within the mold. However, this extremely degrades the thermal conductivity in heat foaming. The gases generated by the heat come out of the sheet material and collect in the space in the mold. These gases are scattered in the outside air upon opening the mold, resulting in nonuniformity of the foam.

In view of the above, for foaming EVA in conventional methods, a sheet material which is formed by adding a foaming agent and a crosslinking agent to the EVA and kneading the mixture is filled in a mold to substantially the mold's full capacity. In order to prevent the explosion and scattering of the foam, the amount of the foaming agent used is limited to 5–15 parts by weight as mentioned above for attaining low foaming. The density of the derived foamed body has thus been ordinarily limited to 0.2–0.4. The density of foamed bodies of the ethylene-vinyl acetate copolymer used for the soles of sandals and shoes available on the market is, in general, in the range of 0.3–0.9. The density of foamed bodies used for other purposes is at best 0.2. Only exploded foamed bodies which cannot serve for actual use attain the specific gravity of 0.12.

Ethylene-vinyl acetate copolymers are superior in strength and abrasion resistance. They are thus expected to provide a wide range of applications from various cushions to industrial materials if low density, highly foamed bodies can be easily manufactured with them.

The present inventors have studied to overcome these problems associated with conventional methods for manufacturing EVA foamed bodies. As a result, it was found that these problems can be solved by temporarily cooling the heat-foamed body before releasing it from the mold, and the present invention has been thus established.

This invention can be more fully understood from the following detailed description when taken in conjunction with the accompanying drawing, in which:

The drawings show stress-strain curves comparing the foamed body of the present invention with conventional foamed bodies.

In accordance with one embodiment of the present invention, a low density foamed body is provided which is below 0.1 in density and which is made of an ethylene-vinyl acetate copolymer. This foamed body is manufactured by the following method. The foamed body material is prepared by adding 20–80 parts by weight of a foaming agent and 1.0–5.0 parts by weight of a crosslinking agent to 100 parts by weight of an ethylene-vinyl acetate copolymer. The mixture is kneaded and is filled into a mold. The mold is closed with a lid and heated for foaming; the foamed body is maintained under pressure. The foamed body is cooled while it is still in the mold, and the lid of the mold is opened thereafter.

An ethylene-vinyl acetate copolymer including 10–40 percent by weight of vinyl acetate is generally used. A foaming agent, a crosslinking agent and other additives are added to this copolymer. The mixture is kneaded sufficiently by a roll into the form of a sheet. The foaming agent to be used here may be one which has been conventionally used in EVA foamed bodies. Examples are azodicarbonamide, dinitrosopentamethylenetetramine, p-toluenesulfonylhydrazine, azobisisobutyronitrile, diazoaminoazobenzene, and toluenesulfonyl semicarbazide. The amount of such a foaming agent is 20–80 parts by weight with respect to 100 parts by weight of EVA, and preferably 20–50 parts by weight. When the amount is less than 20 parts by weight, a low density foamed body cannot be obtained. When it exceeds 80 parts by weight, abrupt foaming occurs, and uniform air bubbles cannot be obtained.

One of the notable differences between the present invention and conventional methods is that the amount of the foaming agent used is greatly increased, when considering the fact that the amount has conventionally been 5–15 parts by weight. A crosslinking agent is added in addition to the foaming agent. For a crosslinking agent which may be used in the present invention, organic peroxides are suitable such as dicumylperoxide, 2,5-dimethyl-2,5-di(tert.-butyl)peroxide, 1,3-bis(tert.-butylperoxyisopropyl)benzene, m-octadecylazidoformate, and tert.-butylperoxycumene. The amount of the crosslinking agent used depends on the amount of the foaming agent and is 1–5 parts by weight, preferably 1–2 parts by weight with respect to 100 parts by weight of EVA. When the amount is less than 1.0 part by weight, the crosslinking is not sufficient. When this exceeds 5 parts by weight, the balance with the amount of the foaming agent is lost, and foaming becomes unstable. Other additives suitable as foaming auxiliaries are urea, amines, colorants, and fillers. These ingredients are sufficiently kneaded and formed into a sheet form. The sheet is cut into a predetermined shape and is put in a mold. The mold to be used here may be of any shape but preferably has an upwardly expanding opening since the article may otherwise pop out abruptly when released from the mold. The foamable material thus obtained is either used to substantially fill the mold, or is slightly pressed into it. A lid is closed thereover, slightly compressing the material, and is securely fastened. The lid may be fixed by any means. However, a convenient method for freely opening and closing the lid and attaining a secure closing of the mold adapts a press machine with a lid mounted on its front end for opening and closing the mold. Immediately after the lid is closed, the mold is heated to effect foaming and activate said cross-linking. The heating temperature is determined by the decomposing temperature of the foaming agent and is usually in the range of about 160°–180° C. After the foaming and cross-linking are completed, the foamed body and the mold are cooled. The cooling temperature here depends on the raw material, that is, the vinyl acetate content of the EVA, the kind and amount of the foaming agent used, the kind and amount of the bridging agent used and other variables. Although it cannot be definitely determined, it is generally within the range of about 60°–130° C. This cooling is a forced cooling and is accomplished by, for example, charging a cooled water in the jacket of the mold. The internal pressure of the mold filled with the heat-foamed EVA decreases under this cooling. This may be attributable to a decrease in the steam pressure generated in the foaming procedure of the EVA due to the temporary temperature drop. After this cooling, the mold is opened and the EVA foamed body pops out of the mold. The volume of the foamed body, in this instance, expands to 15–50 times the original volume. The foamed body in accordance with the present invention is thus obtained. The density of this formed body is below 0.1, in particular 0.02–0.05, which is extremely low in comparison with the value 0.2–0.4 attained with conventional methods. The expansion ratio in accordance with the present invention is improved to 15–50, which has heretofore been at most 2.5–5.

In accordance with the present invention, the EVA foamed body is heated in the mold for foaming under pressure; it is temporarily cooled; the mold is opened; and the foamed body is taken out. The internal pressure of the mold is considered to decrease, and the retention of the shape is considered to improve due to this. The EVA foamed body can be manufactured without causing explosions and scattering any of the low density, highly foamed body which is manufactured by using a large amount of foaming agent. The low density, highly foamed body manufactured by the method according to the present invention has improved flexibility, and impact resilience, and shows, as seen from the attached drawings, characteristics which cannot be attained with conventional foamed bodies such as polyurethane and polyethylene foam. In the drawings are shown stress-strain curves (S-S curves) for polyethylene 1, the foamed body according to the present invention 2, and polyurethane 3 assuming the strain amount is constant. It may be seen from these curves that the foamed body in accordance with the present invention presents a smaller hysteresis loss and improved characteristics.

Further, the EVA foamed body is improved in adhesion and thus provides a wider range of application. More particularly, it may be used for cushions for automobiles, cushions, on which pressures are exerted very frequently, various other cushions, and industrial materials.

EXAMPLE 1

| EVA (VA content 14%) | 100 parts by weight |
| --- | --- |
| Dicumylperoxide | 1.5 parts by weight |
| Azodicarbonamide | 20 parts by weight |
| Calcium carbonate | 20 parts by weight |
| Carbon black | 5 parts by weight |

The EVA, dicumylperoxide, calcium carbonate, and carbon black were mixed and kneaded for 5 minutes by a roll with a surface temperature of 90° C. The azodicarbonamide was added to this mixture and a further kneading was performed for 4 minutes. The mixture was then formed into a sheet 2 mm in thickness. Four such sheets were filled in a mold with a cavity having a thickness of 8 mm, a length and width of 30 cm, and a top opening upwardly expanding at an angle of 45°. A lid was covered thereover. The mold was compressed by a press machine at a pressure of 150 Kg/cm$^2$. Heated steam was introduced into the jacket of the press machine for heating the mold to 170° C. for 15 minutes. The heated steam in the press machine was then discharged and was replaced by water. After 5 minutes, the temperature of the mold was 80° C. The press machine was then released, and the foamed body upwardly popped out. The density of the foamed body was 0.038. The outer appearance of the foamed body conformed to the shape of the cavity of the mold, and no explosion or scattering was noted. The impact resistance of the foamed body was measured according to JISK6401 standard to be 50%. The tensile strength was measured to be 6.9 Kg/cm$^2$. The resiliency was excellent. The abrasion resistance and water impermeability were also good.

EXAMPLE 2

The mixing ratio of the ingredients was changed as shown below, and a foamed body was manufactured in a similar manner as that in Example 1.

| EVA (VA content 14%) | 100 parts by weight |
| --- | --- |
| Dicumylperoxide | 1.5 parts by weight |
| Azodicarbonamide | 25 parts by weight |
| Calcium carbonate | 20 parts by weight |

The heating temperature was 160° C., which is 10° C. lower than the heating temperature of Example 1. After the foaming, water was filled into the jacket of the mold for 2 minutes, and the temperature of the mold was 75° C. thereafter. The remaining procedures were performed in the same manner as in Example 1. The density of the foamed body was measured to be 0.040. The outer appearance was the same as in Example 1.

EXAMPLE 3

The mixing ratio of the ingredients was changed as shown below, and a foamed body was manufactured in a similar manner as in Example 1.

| | |
|---|---|
| EVA (VA content 16%) | 100 parts by weight |
| 1,3-bis(tert.-butylperoxyisopropyl)benzene | 1.5 parts by weight |
| Azodicarbonamide | 30 parts by weight |
| Zinc oxide | 20 parts by weight |

The cooling time was 10 minutes, and the temperature of the mold after cooling was 80° C.

The density of the foamed body was measured to be 0.027.

EXAMPLE 4

The mixing ratio of the ingredients was changed as shown below, and a foamed body was manufactured in a similar manner as in Example 1.

| | |
|---|---|
| EVA (VA content 20%) | 100 parts by weight |
| 1,3-bis(tert.-butylperoxyisopropyl)benzene | 2.0 parts by weight |
| Azodicarbonamide | 40 parts by weight |
| Stearic acid | 5.0 parts by weight |
| Zinc oxide | 5.0 parts by weight |
| Titanium white | 10 parts by weight |

The heating temperature was 165° C., the pressure was 150 Kg/cm$^2$, the foaming time was 20 minutes, and the water cooling was performed for 12 minutes. The temperature of the cooled mold was 80° C. The density of the foamed body was measured to be 0.020.

EXAMPLE 5

The mixing ratio of the ingredients was changed as shown below, and a foamed body was manufactured in a similar manner as in Example 1.

| | |
|---|---|
| EVA (VA content 16%) | 100 parts by weight |
| 1,3-bis(tert.-butylperoxyisopropyl)benzene | 2.5 parts by weight |
| Azodicarbonamide | 55 parts by weight |
| Zinc oxide | 5.5 parts by weight |
| Paraffin | 5.0 parts by weight |
| Stearic acid | 3.0 parts by weight |

The heating temperature was 160° C., the heating time was 25 minutes, and the cooling time was 15 minutes. The mold cooled to 60° C. and was opened.

The density of the obtained foamed body was 0.018.

In another embodiment of the present invention, a mixture is used as a foamable raw material which includes 100 parts by weight of an ethylene-vinyl acetate copolymer, 5-50 parts by weight of polyethylene and/or polystyrene, 20-100 parts by weight of foaming agent, and 1-5 parts by weight of a crosslinking agent. Polyethylene and polystyrene may be used independently of each other with EVA or may be combined in a desired ratio and used with EVA.

When the amount of polyethylene and/or polystyrene is less than 5 parts by weight, the effects which may be obtained by the addition of polyethylene and/or polystyrene, that is, improved impact absorption of the foamed body, cannot be obtained. When this amount exceeds 50 parts by weight, on the other hand, the elasticity of the foamed body is degraded. A foaming agent, a crosslinking agent and other additives are added to the above ingredients, and the mixture is fully kneaded by, for example, a roll and formed into a sheet.

The amount of the foaming agent to be used is 20-100, and preferably 20-50 parts by weight with respect to 100 parts by weight of the EVA. When this amount is less than 20 parts by weight, a low density, highly foamed body cannot be obtained. When this exceeds 100 parts by weight, the foamed body is subject to deformation and scattering during the foaming process. The amount of the crosslinking agent to be used depends on the amount of the foaming agent used and is 1-5 parts by weight, and preferably 1-2 parts by weight, with respect to 100 parts by weight of the EVA. When this is less than 1 part by weight, the crosslinking is not sufficient. When this exceeds 5 parts by weight, the flexibility is degraded. Other additives suitable as foaming auxiliaries are urea, amines, colorants, and fillers. The foaming agent and the crosslinking agent may be mixed with the polyethylene and/or polystyrene in advance.

These ingredients are well mixed and kneaded by a roll or a kneader and formed into a sheet. The sheet is cut into a desired size and is filled into a mold.

The composite foamed body of an ethylene-vinyl acetate copolymer and polyethylene and/or polystyrene is highly foamed and has a low density. Further, since it includes polyethylene and/or polystyrene as ingredients, it is excellent in impact resilience, and shock absorption.

EXAMPLE 6

| | |
|---|---|
| EVA (VA content 14%) | 70 parts by weight |
| Polyethylene | 30 parts by weight |
| Zinc stearate | 3.0 parts by weight |
| Azodicarbonamide | 25 parts by weight |
| Dicumylperoxide | 2.5 parts by weight |

The above-mentioned ingredients excluding azodicarbonamide were mixed and kneaded by a roll with a surface temperature of 90° C. for 5 minutes. After the azodicarbonamide was mixed therein, the mixture was again kneaded for 4 minutes and formed into a sheet of 2 mm in thickness. Four such sheets were put in a mold with a cavity having a depth of 8 mm, a width and length of 25 cm, and a top opening upwardly expanding at an angle of 45°. A lid was placed on the mold. The mold was held by a press machine at a pressure of 150 Kg/cm$^2$. Heated steam was introduced into the jacket of the press machine to heat the mold to 175° C., and it was maintained at this temperature for 10 minutes. The heated steam was then discharged and replaced by water to cool the mold to 95° C. The press machine was then released, and the foamed body popped out upwardly. The density of the foamed body thus obtained was measured to be 0.022, and its outer appearance was uniform. The impact absorption was vastly superior to that of the conventional foamed bodies.

In still another embodiment in accordance with the present invention, a mixture was used as a raw material which includes 100 parts by weight of an ethylene-vinyl acetate copolymer, 5-50 parts by weight of a polyvinyl chloride resin paste, 20-70 parts by weight of a foaming agent, and 1.0-5.0 parts by weight of a crosslinking agent. This vinyl chloride paste is prepared by adding 50-150 parts by weight of a plasticizer and 3-8 parts by weight of a stabilizer to 100 parts by weight of the vinyl chloride resin. 5-50 parts by weight of the vinyl chloride resin paste is added to 100 parts by weight of EVA. When this amount is less than 5 parts by weight, the flexibility expected from the addition of the vinyl chloride is not sufficient. When this exceeds 50 parts by weight, the mixing ratio of EVA becomes too small. A foaming agent, a bridging agent, and other additives are added to this mixture, and it is fully kneaded and formed into a sheet. The foaming agent used here may be the one which is ordinarily used in EVA foamed bodies and vinyl chloride foamed bodies. 20-70 parts by weight, and preferably 20-50 parts by weight of the foaming agent is added to 100 parts by weight of the EVA. When this is less than 20 parts by weight, a low density, highly foamed body may not be obtained. When this exceeds 70 parts by weight, the formed body is subject to deformation and scattering upon release from the mold. The amount of the crosslinking agent depends on the amount of the foaming agent and is 1-5 parts by weight, and preferably 1-2 parts by weight, with respect to 100 parts by weight of the EVA. When this is less than 1 part by weight, sufficient crosslinking may not be obtained. When this exceeds 5 parts by weight, the flexibility is degraded. Other additives may be included as foaming auxiliaries such as urea, amines, colorants, and fillers. The foaming agent and the crosslinking agent among the above-mentioned ingredients can be mixed in the vinyl chloride paste in advance.

These ingredients are well mixed and kneaded by a roll or a kneader and formed into a sheet. After this sheet is cut into a desired size, it is filled into a mold.

A composite foamed body of an ethylene-vinyl acetate copolymer and a vinyl chloride resin manufactured in accordance with the present invention is highly foamed and of low density, and exhibits good impact resilience, and flexibility since it includes vinyl chloride.

EXAMPLE 7

| | |
|---|---|
| EVA (VA content 14%) | 70 parts by weight |
| Vinyl chloride resin | 15 parts by weight |
| Dioctylphthalate | 15 parts by weight |
| Zinc stearate | 3.0 parts by weight |
| Azodicarbonamide | 20 parts by weight |
| Dicumylperoxide | 2.5 parts by weight |

The vinyl chloride resin and dioctylphthalate were kneaded by a kneader into a pasted form. The other ingredients excluding azodicarbonamide were mixed in and kneaded for 5 minutes by a roll with a surface temperature of 90° C. After the azodicarbonamide was mixed in, the mixture was further kneaded for 4 minutes and formed into a sheet of 2 mm in thickness. Four such sheets were put into a mold with a cavity having a depth of 8 mm, a length and width of 25 cm and a top opening upwardly expanding at an angle of 45°. A lid was placed thereover, and the mold was pressed by a press machine at a pressure of 150 Kg/cm². Heated steam was introduced into the jacket of the press machine to heat it to 170° C., and this temperature was maintained for 12 minutes. The heated steam in the press machine was discharged and replaced with water for cooling the mold to 80° C. When the press machine was released thereafter, the foamed body popped up. The density of the foamed body was measured to be 0.028 g/cm², and its outer appearance was uniform. The hardness of the foamed body, when measured by a C type hardness tester, was 6-7.

A comparative sample was prepared in the same manner, except that the vinyl chloride resin and the zinc stearate were excluded from the ingredients. The hardness of this sample was measured to be 13-15.

In still another embodiment of the present invention, a method for manufacturing a low density synthetic resin foamed body is provided which is characterized by the steps of inserting a plurality of bar members for forming spaces in the above-mentioned foamable material; filling the material into a mold; closing the mold by a lid; heating the mold for foaming so that the foamed body is compressed within the mold; cooling the mold; releasing the lid from the mold for releasing the foamed body from the mold; and removing the bar members for forming spaces in the foamed body.

The above-mentioned ingredients are well mixed and kneaded and formed into a sheet form. After the sheet is cut into a desired size, it is put in a mold together with a number of bar members for forming spaces. That is, in filling the foamable material in sheet form into a mold, a plurality of bar members for forming spaces are inserted in the material so as to go through both sides, thereof. More particularly, the foamable material sheet comprises a plurality of sheets. The plurality of bar members are embedded in this sheet construction in one or more steps so that they are mutually parallel, crossed or in any other desired arrangement. The bar members used in the present invention for forming spaces may be aluminum, steel, stainless steel, or any other metal material, or a thermosetting resin such as a melamine resin or a phenol resin. The cross section of these bar members may be circular, elliptical, rectangular or any other desired shape. The diameter of these members is not particularly limited. However, the length of these bar members must be such that they extend from one end face to the other end face of the foamable material.

EXAMPLE 8

| | |
|---|---|
| EVA (VA content 14%) | 100 parts by weight |
| Dicumylperoxide | 1.5 parts by weight |
| Azodicarbonamide | 20 parts by weight |
| Calcium carbonate | 15.0 parts by weight |

The EVA, dicumylperoxide and calcium carbonate were mixed well and kneaded for 5 minutes by a roll with a surface temperature of 90° C. the dicumylperoxide was added to this mixture and kneaded for 4 more minutes, and the resultant mixture was formed into a sheet 2 mm in thickness. The sheet was cut into the same size as the cavity of the mold described below. Two such sheets were first put into a mold with a cavity having a depth of 8 mm and a length and width of 30 cm and a top opening upwardly expanding at an angle of 45°. Ten round bars of stainless steel, each 2 mm in diameter and 30 cm in length, were placed thereover, separated by equal intervals. Two more sheets were placed thereover, and the mold was closed with a lid. The mold was pressed with a press machine at a pressure of 150 Kg/cm². Heated steam was introduced into the jacket of the press machine to heat the mold to 170° C., and this temperature was maintained for 15 minutes. The heated steam was discharged thereafter and replaced by water. After the mold was left to stand for 5 minutes, its temperature was 80° C. The press was released, and the foamed body popped out from the mold. The ten bars embedded in the foamed body were pulled out. The density of the obtained foamed body was 0.035, and each of the spaces formed by the bars, had a diameter of 8 mm. The outer appearance of the foamed body was the same as that of the cavity of the mold, and no cracks or explosions were observed. The impact resilience of the foamed body was measured according to the JISK6401 standard to be 55% in mean value. The tensile strength was 6.5 Kg/cm². The resilience was very good. The abrasion resistance and water impermeability were also excellent.

EXAMPLE 9

The mixing ratio of the ingredients were changed as shown below, and a foamed body was manufactured in a manner similar to Example 8. The round bars used were of stainless steel with a diameter of 3 mm.

| | |
|---|---|
| EVA (VA content 14%) | 100 parts by weight |
| Dicumylperoxide | 1.5 parts by weight |
| Azodicarbonamide | 25 parts by weight |
| Calcium carbonate | 20 parts by weight |

The heating temperature was 160° C., which is 10° C. lower than that of Example 8. After the foaming, water was introduced into the jacket of the mold, and the mold was left to stand for 2 minutes. The temperature of the mold was then 75° C. The process of Example 8 was performed, and the foamed body was taken out. The density of the obtained foamed body was 0.029, and each of the spaces, remaining after pulling out the round bars was 12 mm in diameter.

EXAMPLE 10

The mixing ratio of the ingredients was changed as shown below, and a foamed body was manufactured in a manner similar to Example 9. The round bars used were of phenol resin and were 2 mm in diameters.

| | |
|---|---|
| EVA (VA content 16%) | 100 parts by weight |
| 1,3-bis(tert.-butylperoxyisopropyl)benzene | 2.2 parts by weight |
| Azodicarbonamide | 30 parts by weight |
| Zinc oxide | 15 parts by weight |

The cooling time was 10 minutes, and the temperature of the mold was 70° C.

The density of the obtained foamed body was 0.025, and the spaces were 10 mm in diameter.

In still another embodiment of the present invention, a method for manufacturing a low density synthetic resin foamed body is provided which is characterized by the steps of putting in a mold a plurality of sheets of the above-mentioned foamable raw material with release sheets interposed therebetween; closing the mold with a lid, heating the mold for foaming so that the foamed body is under pressure in the mold; cooling the mold; releasing the lid of the mold; and removing the release sheets interposed between the foamed sheets.

The above-mentioned foamable materials are well mixed and kneaded, and then formed into a plurality of sheets. After a sheet is cut to a desired size, a plurality of these cut sheets are put in a mold with release sheets interposed therebetween. A plurality of such sheets with release sheets interposed between each pair of adjacent sheets is used to cover the entire area. The thickness of the stacked sheets is prepared to be the same as the depth of the mold. The stacked sheets are placed in the mold. The release sheets used here may be release paper, cloth, an aluminum film, a synthetic resin plate, or a metal plate. Silicone oil, wax emulsion or the like is applied to the front surface and rear surface of the release sheets as needed. The thickness of the release sheets is not particularly limited. It is better to keep this as thin as possible, since the filling space for the foamable sheets becomes small when the thickness is too great, resulting in inefficiency. As a special case of a release sheet in accordance with the present invention, a thin layer may be used which is formed by painting a liquid release agent such as silicone oil, wax emulsion or the like between sheets of foamable material. The mold used for molding of these foamable materials may be of any desired shape but preferably has a top opening which is upwardly enlarged since the foamed body abruptly pops out of the mold. The foamable material is filled into the cavity of the mold to substantially full capacity, or is filled in a slightly compressed form, and a lid is pressed on the mold for securely holding it. After the foamed body is released from the mold, the release sheets interposed between the sheets of raw material are removed. Thus, the foamed body is separated into sheets, each 2-3 mm in thickness. Thus, thin, smooth sheets may be molded with one molding cycle without going through a slicing process. The thin sheets thus derived do not exhibit any distortion due to the fact that the foaming is carried out with sufficient thickness. Thus, the thin sheets do not appear wavy when placed on an even surface. With the method of the present invention, a sheet 1/500 to 1/300 (about 2-3 mm) of the total thickness can be manufactured with a sheet 1 m in length and width. A number of thin sheets, 1/10 sheets manufactured by conventional methods (1/50 to 1/30 of the total thickness, or about 20-30 mm) may be manufactured in one molding cycle.

EXAMPLE 11

| | |
|---|---|
| EVA (VA content 14%) | 80 parts by weight |
| Polyethylene | 20 parts by weight |
| Dicumylperoxide | 1.5 parts by weight |
| Azodicarbonamide | 20 parts by weight |
| Zinc stearate | 3 parts by weight |
| Carbon black | 20 parts by weight |

The EVA, polyethylene, dicumulperoxide, zinc stearate, and carbon black were mixed and kneaded for 5 minutes by a roll with a surface temperature of 90° C. The azodicarbonamide was added to the mixture and the mixture was further kneaded for 4 minutes and formed into a sheet 1 mm in thickness. Seven of these sheets, with commercially available release papers interposed between every two adjacent sheets, were put into a mold with a cavity having a depth of 8 mm, a length of 270 mm and a width of 200 mm and a top opening upwardly enlarged. A lid was used to cover the mold. This mold was pressed by a press machine at a pressure of 150 Kg/cm². Heated steam was introduced into the jacket of the mold to heat the mold to 165° C., and this temperature was maintained for 15 minutes. The heated steam was discharged thereafter and replaced by water. After being left to stand for 5 minutes, the mold was at a temperature of 85° C. The press machine was released and the foamed body popped from the bottom and the top of the mold. A low density foamed body was thus obtained.

The release sheets between the foamed material were removed, and seven separate foamed sheets were thus obtained. EAch of the obtained sheets had dimensions of 840×670×3.2 mm and the specific gravity was 0.028. None of these sheets exhibited any distortion or waviness when placed on an even surface.

EXAMPLE 12

| | |
|---|---|
| EVA (VA content 14%) | 100 parts by weight |
| Dicumylperoxide | 1.0 parts by weight |
| Azodicarbonamide | 20 parts by weight |
| Calcium carbonate | 20 parts by weight |

In a manner similar to that in Example 11, the EVA, dicumylperoxide, and calcium carbonate were mixed and kneaded for 5 minutes with a roll having a surface temperature of 90° C. The azodicarbonamide was added to the mixture, and the mixture was further kneaded for 4 minutes and formed into a sheet 1.5 mm in thickness. This sheet was cut into the same size as that of the cavity of the mold. Four such sheets with a 0.3 mm thick galvanized steel sheet interposed between each pair of adjacent sheets were put into a mold with a cavity having a thickness of 7 mm, a length of 270 mm and a width of 200 mm. A lid was made to cover the mold. The mold was pressed at a pressure of 100 Kg/cm$^2$ by a press machine. Heated steam was introduced into the jacket of the press machine to heat the mold to 170° C., and the mold was left to stand for 13 minutes. The heated steam in the press was discharged and replaced by water. After 7 minutes, the temperature of the mold was 80° C. The mold was then released, and the EVA foamed body popped out from the bottom and the top of the mold. The galvanized steel sheets between the foamed sheets were removed. Four foamed sheets were thus obtained, and each of them had dimensions of 630×510×3.6 mm and a specific weight of 0.07. No distortions were observed in these sheets.

The low density foamed body in accordance with the method of the present invention may be manufactured by a two-step foaming method to be described hereinbelow. In this method, the above-mentioned foamable material is put into a mold, and the mold is closed with a lid. After heating, the mold is cooled, and a primary foamed body is taken out of the mold. This primary foamed body is put into another mold and reheated to obtain a final product. The points to be observed in this two-step foaming method are: to set the primary cooling temperature to be lower than that of the primary foaming temperature, e.g., 50°–100° C.; and to set the reheating temperature to be lower than that in the one-step foaming method, e.g., 100°–130° C. Foamed bodies which are superior in consistency of form and outer appearance can be obtained with this two-step foaming method.

What we claim is:

1. A method for manufacturing a low density synthetic resin foamed body comprising the steps of forming a mixture of 100 parts by weight of an ethylene-vinyl acetate copolymer, 20–80 parts by weight of a foaming agent, and 1.0–5.0 parts by weight of a cross-linking agent into a sheet, positioning said sheet in a mold, closing the mold with a lid, heating the mold to heat said sheet and to decompose said foaming agent and cross-linking agent to form an integral foamed body from said sheet and forcibly cooling said foamed body as it is kept in the mold with the lid closed, and opening the lid of the mold to remove said cooling integral low density foamed body which has a density of less than 0.1 and which is expanded to a volumne at least 15 times the volume of said sheet.

2. The method as claimed in claim 1 wherein said mixture comprises 100 parts by weight of an ethylene-vinyl acetate copolymer, 20–100 parts by weight of a foaming agent, 1–5 parts by weight of a crosslinking agent, and 5–50 parts by weight of polyethylene or polystyrene or both.

3. The method as claimed in claim 1 wherein said mixture comprises 100 parts by weight of an ethylene-vinyl acetate copolymer, 5–50 parts by weight of a polyvinyl chloride resin paste, 20–70 parts by weight of a foaming agent, and 1.0–5.0 parts by weight of a crosslinking agent.

4. The method as claimed in claim 3 wherein the polyvinyl chloride resin paste comprises 100 parts by weight of polyvinyl chloride resin, 50–150 parts by weight of a plasticizer, and 3–8 parts by weight of a stabilizer.

5. The method of claim 1 wherein the vinyl acetate content of the ethylene-vinyl acetate copolymer is between 10 and 40% by weight of said copolymer, and wherein said foamed body is forcibly cooled to a cooling temperature of between about 60° and 130° C.

6. The method of claim 5 wherein said mold is heated to a heating temperature of between about 160° and 180° C.

7. The method of claim 5 or 6 wherein said mixture comprises 100 parts by weight of an ethylene-vinyl acetate copolymer, 20–100 parts by weight of a foaming agent, 1–5 parts by weight of a crosslinking agent, and 5–50 parts by weight of polyethylene or polystyrene or both.

8. The method of claim 5 or 6 wherein said mixture comprises 100 parts by weight of an ethylene-vinyl acetate copolymer, 5–50 parts by weight of a polyvinyl chloride resin paste, 20–70 parts by weight of a foaming agent, and 1.0–5.0 parts by weight of a crosslinking agent.

9. The method as claimed in any of claims 1 2, or 3 wherein said mold is heated to a heating temperature of about 160°–180° C.

10. The method as claimed in any of claims 1 2, or 3 wherein said foamed body is forcibly cooled to a cooling temperature of about 60°–130° C.

11. The method of claim 1 or 2 or 3 wherein said mixture is formed into a plurality of sheets, said sheets are positioned one upon the other to form a stack of sheets, positioning said stack of sheets in said mold, closing the mold with a lid, heating the mold to heat said stack of sheets and to decompose said foaming agents and activate said cross-linking agents to form respective integral foamed bodies from each of said sheets and forcibly cooling said foamed bodies in the mold with the lid closed, and opening the lid of the mold to remove the cooled integral low density foamed bodies formed from respective sheets.

12. The method as claimed in any of claims 1 2, or 3 wherein the vinyl acetate content of the ethylene-vinyl acetate copolymer is 10–40 percent by weight.

13. The method as claimed in any of claims 1 2, or 3 which further includes the steps of embedding bar members for forming spaces in said mixture, and pulling out said bar members from the foamed body taken out of the mold.

14. The method as claimed in any of claims 1 2, or 3 which further includes the steps of interposing release sheets between sheets of said mixture and removing said release sheets from the foamed body taken out of the mold.

* * * * *